US007350139B1

(12) United States Patent
Simons

(10) Patent No.: US 7,350,139 B1
(45) Date of Patent: Mar. 25, 2008

(54) SYSTEM AND METHOD FOR UTILIZING A DRAG AND DROP TECHNIQUE TO COMPLETE ELECTRONIC FORMS

(75) Inventor: Geoffrey W. Simons, Seattle, WA (US)

(73) Assignee: American Express Travel Related Services Company, Inc., New York, NY (US)

( * ) Notice: Subject to any disclaimer, the term of this patent is extended or adjusted under 35 U.S.C. 154(b) by 737 days.

(21) Appl. No.: 09/595,622

(22) Filed: Jun. 16, 2000

(51) Int. Cl.
*G06F 15/00* (2006.01)

(52) U.S. Cl. ...................................... 715/508; 715/507

(58) Field of Classification Search ................ 715/505, 715/506, 507, 508, 501.1, 500, 760, 769; 345/760, 769
See application file for complete search history.

(56) References Cited

U.S. PATENT DOCUMENTS

| | | | | |
|---|---|---|---|---|
| 5,450,537 A * | 9/1995 | Hirai et al. | ................ | 715/507 |
| 5,721,940 A * | 2/1998 | Luther et al. | ............... | 715/506 |
| 5,832,100 A * | 11/1998 | Lawton et al. | .............. | 382/100 |
| 5,844,971 A * | 12/1998 | Elias et al. | ............ | 379/100.11 |
| 5,870,552 A * | 2/1999 | Dozier et al. | ............... | 709/219 |
| 5,933,778 A * | 8/1999 | Buhrmann et al. | ......... | 455/461 |
| 5,960,411 A | 9/1999 | Hartman et al. | | |
| 6,035,276 A * | 3/2000 | Newman et al. | ............... | 705/2 |
| 6,088,700 A * | 7/2000 | Larsen et al. | .................. | 707/10 |
| 6,192,380 B1 * | 2/2001 | Light et al. | ................. | 715/505 |
| 6,192,381 B1 * | 2/2001 | Stiegemeier et al. | ........ | 715/505 |
| 6,193,152 B1 * | 2/2001 | Fernando et al. | ........... | 235/380 |
| 6,199,079 B1 * | 3/2001 | Gupta et al. | ................ | 715/507 |
| 6,208,339 B1 * | 3/2001 | Atlas et al. | ................ | 345/780 |
| 6,345,256 B1 * | 2/2002 | Milsted et al. | ................ | 705/1 |

(Continued)

FOREIGN PATENT DOCUMENTS

WO WO 98/04976 2/1998

OTHER PUBLICATIONS

Mukherjee, Automating Forms Publishing with the Intelligent Filing Manager, IEEE 1999, pp. 308-313.*

(Continued)

*Primary Examiner*—Cong-Lac Huynh
(74) *Attorney, Agent, or Firm*—Snell & Wilmer L.L.P.

(57) ABSTRACT

A system and method for utilizing a drag and drop technique to complete electronic forms are provided. A document browser computer (30) accesses one or more electronic forms provided by a document server (32) via an active Internet browser application window. A URL link to a fill server (34) is established and a separate application window is created on the document browser display (66). A user ID, password and signature of the electronic form are passed from the document browser computer (30) to the fill server (34). The fill server (34) creates a fill bundle including shippable code corresponding to a merger of raw user data from a user profile and a form map derived from the electronic form signature. The fill bundle is returned to the document browser computer (30) and presented on the browser computer's display as an icon (111) within the open fill bundle window (110). The fill bundle icon (111) is selected and dragged from the fill bundle window (110) to an electronic form application window (93) causing the shippable code to be executed. Accordingly, one or more fields are completed and the form may be submitted o the requesting provider.

16 Claims, 18 Drawing Sheets

U.S. PATENT DOCUMENTS

| | | | |
|---|---|---|---|
| 6,409,592 B1* | 6/2002 | McCoy et al. | 462/6 |
| 6,490,601 B1* | 12/2002 | Markus et al. | 715/507 |
| 6,505,230 B1* | 1/2003 | Mohan et al. | 709/202 |
| 6,571,214 B2* | 5/2003 | Newman et al. | 705/2 |
| 6,589,290 B1* | 7/2003 | Maxwell et al. | 715/507 |
| 6,651,217 B1* | 11/2003 | Kennedy et al. | 715/507 |
| 6,662,340 B2* | 12/2003 | Rawat et al. | 715/507 |
| 6,704,906 B1* | 3/2004 | Yankovich et al. | 715/505 |
| 6,820,204 B1* | 11/2004 | Desai et al. | 726/6 |
| 6,842,737 B1* | 1/2005 | Stiles et al. | 705/6 |
| 6,944,669 B1* | 9/2005 | Saccocio | 709/229 |
| 6,959,414 B1* | 10/2005 | Kakehashi | 715/507 |
| 7,051,273 B1* | 5/2006 | Holt et al. | 715/506 |
| 7,174,342 B1* | 2/2007 | Scheurich et al. | 707/102 |
| 2001/0032094 A1* | 10/2001 | Ghosh et al. | 705/1 |
| 2002/0013788 A1* | 1/2002 | Pennell et al. | 707/507 |
| 2002/0087496 A1* | 7/2002 | Stirpe et al. | 706/45 |
| 2002/0108057 A1* | 8/2002 | Zhanhong Wu et al. | 713/201 |
| 2002/0120474 A1* | 8/2002 | Hele et al. | 705/4 |
| 2002/0161605 A1* | 10/2002 | Newman et al. | 705/2 |
| 2003/0028792 A1* | 2/2003 | Plow et al. | 713/193 |
| 2003/0065721 A1* | 4/2003 | Roskind | 709/204 |
| 2003/0140312 A1* | 7/2003 | Mohan et al. | 715/513 |
| 2004/0039988 A1* | 2/2004 | Lee et al. | 715/505 |
| 2004/0064351 A1* | 4/2004 | Mikurak | 705/7 |
| 2004/0205525 A1* | 10/2004 | Murren et al. | 715/505 |
| 2004/0205526 A1* | 10/2004 | Borodovski et al. | 715/505 |
| 2004/0205530 A1* | 10/2004 | Borg | 715/507 |
| 2005/0044423 A1* | 2/2005 | Mellmer et al. | 713/201 |
| 2006/0000900 A1* | 1/2006 | Fernandes et al. | 235/380 |
| 2006/0178918 A1* | 8/2006 | Mikurak et al. | 705/7 |

OTHER PUBLICATIONS

Maret et al., Multimedia Information Interchange : Web Forms Meet Data Servers, IEEE 1999, pp. 499-505.*

Bowen, Barry D., "How popular sites use cookie technology," *Netscape Enterprise Developer*, Apr. 1997.

Sirbu, Marvin and J.D. Tygar, "NetBill: An Internet Commerce System Optimized for Network-Delivered Services," *IEEE Personal Communications*, 34-39, Aug. 1995.

Unknown, "Gator offers one-click shopping at over 5,000 e-commerce sites today," *Internet Publication*, Origin Unknown, Jun. 14, 1999.

Unknown, "E-Commerce Leaders Announce Universal Formats for Simplified Online Payments," *Internet Publication*, Origin Unknown, Jun. 14, 1999.

* cited by examiner

SYSTEM AND METHOD FOR UTILIZING A DRAG AND DROP TECHNIQUE TO COMPLETE ELECTRONIC FORMS

FIELD OF THE INVENTION

In general, the present invention relates to computer software for filling out forms, and, in particular, to a method and system for completing one or more fields of an electronic form.

BACKGROUND OF THE INVENTION

Individual computing is continuously increasing. In general, a typical computer user has access to multiple computer systems, many of which are connected to external computer networks, such as the Internet. For example, users may have access to the Internet at work, at school, at home or via a portable device. Additionally, users may utilize establishments that rent computer systems and provide Internet access on a time basis, such as by the hour.

By connecting to the Internet, a user can access a variety of information available on networks such as the Word Wide Web ("Www" or "Web"). The presentation of the information generally ranges from static textual and graphic images to more interactive presentations requiring action and/or information from the user. Accordingly, a user may repeatedly access the same information on the Internet from a variety of computer systems dependent on the time of day and the proposed use (e.g., business vs. personal).

As computer network use increases, the amount of information that is transmitted between computer systems within the common network also increases. For example, within a network such as the Internet, WWW browser application programs on a computer system allow a user to view and extract information from the Internet that is provided by one or more content provider computer systems. One manner of communicating information from a user computer system to the content provider requires the user to actively complete and submit one or more data fields on a Web site, generally referred to as an electronic form. Often, the fields on the form request standard information such as a user name, a user password and/or additional contact information. Additionally, with respect to electronic commerce, or e-commerce, Internet applications, the requested information can include credit information and user-specific preferences, such as sizes, color preferences, style preferences, and/or a shipping address.

Many content providers require a user to fill out an electronic form to access their information or to utilize the service being offered. If numerous Web sites require the user to fill out the same information or if a user utilizes the same Web site repeatedly, having to fill out the same information each time, the completion of electronic forms becomes a time consuming and inefficient process.

One conventional method of assisting a user in filling out an electronic form entails having the user load and utilize a client-based application program on the user's computer system to assist the user in completing the electronic form fields. In this method, the user installs the client-based application program into the user's computer system and inputs his or her personal information. The information is then stored locally on the user's computer. Accordingly, when the user is required to fill out an electronic form, the client-based application program is initiated and the fields corresponding to the user's input are completed. Some conventional client-based application programs require an affiliation with the content provider to properly complete the form. Other client-based application programs provide the user with a display of their user information, which the user selectively transfers to the electronic form, and do not require any affiliation with the electronic form provider.

Another method for assisting a user in filling out an electronic form is referred to as a "transactor" method which entails a third party computer system directly interacting with the electronic form provider. Unlike the client-based application program, the transactor method does not require the user to install or maintain software on the user computer system. Instead, personal information items are inputted and stored in a database on a remote, third party server. To transfer the information, the user accesses the third party server by activating a connection to the third party transactor system. The transactor system then establishes a communication link with the content provider and transmits the user information to the content provider.

There are, however, deficiencies associated with both the client-based and transactor methods. The client-based method requires a user to install and maintain software on his or her computer system. As mentioned previously, however, a user may utilize two or more computer systems on a frequent basis. Accordingly, the client-based method would require the user to install the client-based software on each system. Additionally, the user would have to maintain user information on each computer system as well. From a security perspective, if more than one user utilizes the same computer system, the user's private information may be accessible by an unauthorized person using the same computer system. Moreover, another deficiency associated with the client-based application method is that users are often restricted from installing and maintaining unauthorized (nonstandard) software on the computer systems they use. Accordingly, a user utilizing multiple computer systems could be restricted as to which computer systems are allowed to run the client-based application program.

Although the transactor method attempts to overcome this deficiency by not requiring the user to install or maintain software on the user system, the transactor method requires cross-communication between application program windows. It is generally known that such communication may present a security risk of the user's information. Additionally, cross-communication between two applications may be more time consuming and reduces the benefit of the method.

Based on the above-mentioned deficiencies in the related art, there is a need for a system and method for completing electronic forms that does not require a user to install or maintain software on a specific user computer system and that can be utilized by a user from any number of computer systems. Additionally, there is a need for a system and method for completing electronic forms that does not require a cross-communication of the user information.

SUMMARY OF THE INVENTION

Described generally, a method for completing an electronic form is provided. In accordance with the method, an electronic form having one or more fields to be completed is obtained. A user profile containing user data corresponding to the one or more fields of the electronic form is also obtained. Upon the transfer of the user profile to the electronic form, at least one of the fields of the electronic form is completed with the user data.

Further described, a system and method for utilizing a drag and drop technique to complete electronic forms are provided. A document browser computer accesses one or more electronic forms provided by a document server via an active Internet browser application window. A URL link to a fill server is established and a separate application window is created on the document browser computer display. A user ID, password and signature of the electronic form are passed from the document browser computer to the fill server. The fill server creates a fill bundle embodied in shippable code corresponding to a merger of raw user data from a user profile and a form map derived from the electronic form signature. The fill bundle is returned to the document browser computer and presented on the document browser computer's display as an icon within an open fill bundle window. The fill bundle icon is selected and dragged from the fill bundle window to the electronic form application window causing the shippable code to be executed. Accordingly, one or more fields on the electronic form are completed and the form may be submitted to the requesting provider.

In accordance with other aspects of the invention, a system, a method for generating a graphical display, a method for creating a user profile, and one or more computer-readable mediums containing computer-readable instructions are provided.

BRIEF DESCRIPTION OF THE DRAWINGS

The foregoing aspects and many of the attendant advantages of this invention will become more readily appreciated as the same become better understood by reference to the following detailed description, when taken in conjunction with the accompanying drawings, wherein.

DETAILED DESCRIPTION OF THE INVENTION

Figure 1:
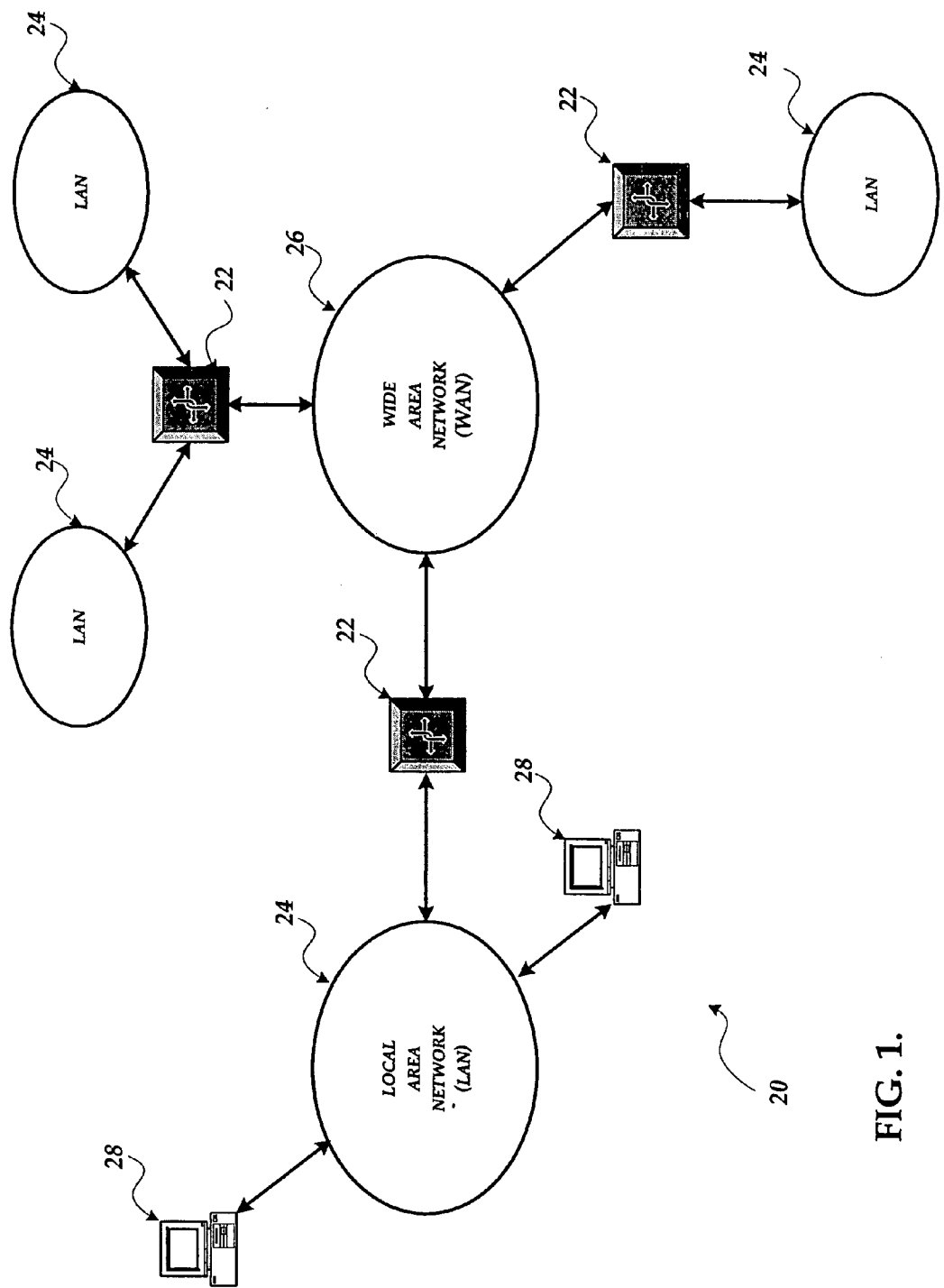
FIG. 1 is a block diagram of a representative portion of the Internet.

As described above, aspects of the present invention are embodied in a WWW site accessible via the Internet. As is well known to those skilled in the art, the term "Internet" refers to the collection of networks and routers that use the Transmission Control Protocol/Internet Protocol ("TCP/IP") to communicate with one another. A representative section of the Internet 20 is shown in FIG. 1, in which a plurality of local area networks ("LANs") 24 and a wide area network ("WAN") 26 are interconnected by routers 22. The routers 22 are special purpose computers used to interface one LAN or WAN to another. Communication links within the LANs may be twisted wire pair, or coaxial cable, while communication links between networks may utilize 56 Kbps analog telephone lines, 1 Mbps digital T-1 lines, 45 Mbps T-3 lines or other communications links known to those skilled in the art. Furthermore, computers and other related electronic devices can be remotely connected to either the LANs 24 or the WAN 26 via a modem and temporary telephone or wireless link. It will be appreciated that the Internet 20 comprises a vast number of such interconnected networks, computers, and routers and that only a small, representative section of the Internet 20 is shown in FIG. 1.

The Internet has recently seen explosive growth by virtue of its ability to link computers located throughout the world. As the Internet has grown, so has the WWW. As is appreciated by those skilled in the art, the WWW is a vast collection of interconnected or "hypertext" documents written in HyperText Markup Language ("HTML"), or other markup languages, that are electronically stored at "WWW sites" or "Web sites" throughout the Internet. A WWW site is a server connected to the Internet that has mass storage facilities for storing hypertext documents and that runs administrative software for handling requests for those stored hypertext documents. A hypertext document normally includes a number of hyperlinks, i.e., highlighted portions of text which link the document to another hypertext document possibly stored at a WWW site elsewhere on the Internet. Each hyperlink is associated with a Uniform Resource Locator ("URL") that provides the exact location of the linked document on a server connected to the Internet and describes the document. Thus, whenever a hypertext document is retrieved from any WWW server, the document is considered to be retrieved from the WWW. As is known to those skilled in the art, a WWW server may also include facilities for storing and transmitting application programs, such as application programs written in the JAVA® programming language from Sun Microsystems, for execution on a remote computer. Likewise, a WWW server may also include facilities for executing scripts and other application programs on the WWW server itself.

A consumer or other remote user may retrieve hypertext documents from the WWW via a WWW browser application program. A WWW browser, such as Netscape's NAVIGATOR® or Microsoft's Internet Explorer, is a software application program for providing a graphical user interface to the WWW. Upon request from the consumer via the WWW browser, the WWW browser accesses and retrieves the desired hypertext document from the appropriate WWW server using the URL for the document and a protocol known as HyperText Transfer Protocol ("HTTP"). HTTP is a higher-level protocol than TCP/IP and is designed specifically for the requirements of the WWW. It is used on top of TCP/IP to transfer hypertext documents between servers and clients. The WWW browser may also retrieve application programs from the WWW server, such as JAVA applets, for execution on the client computer.

Figure 2:
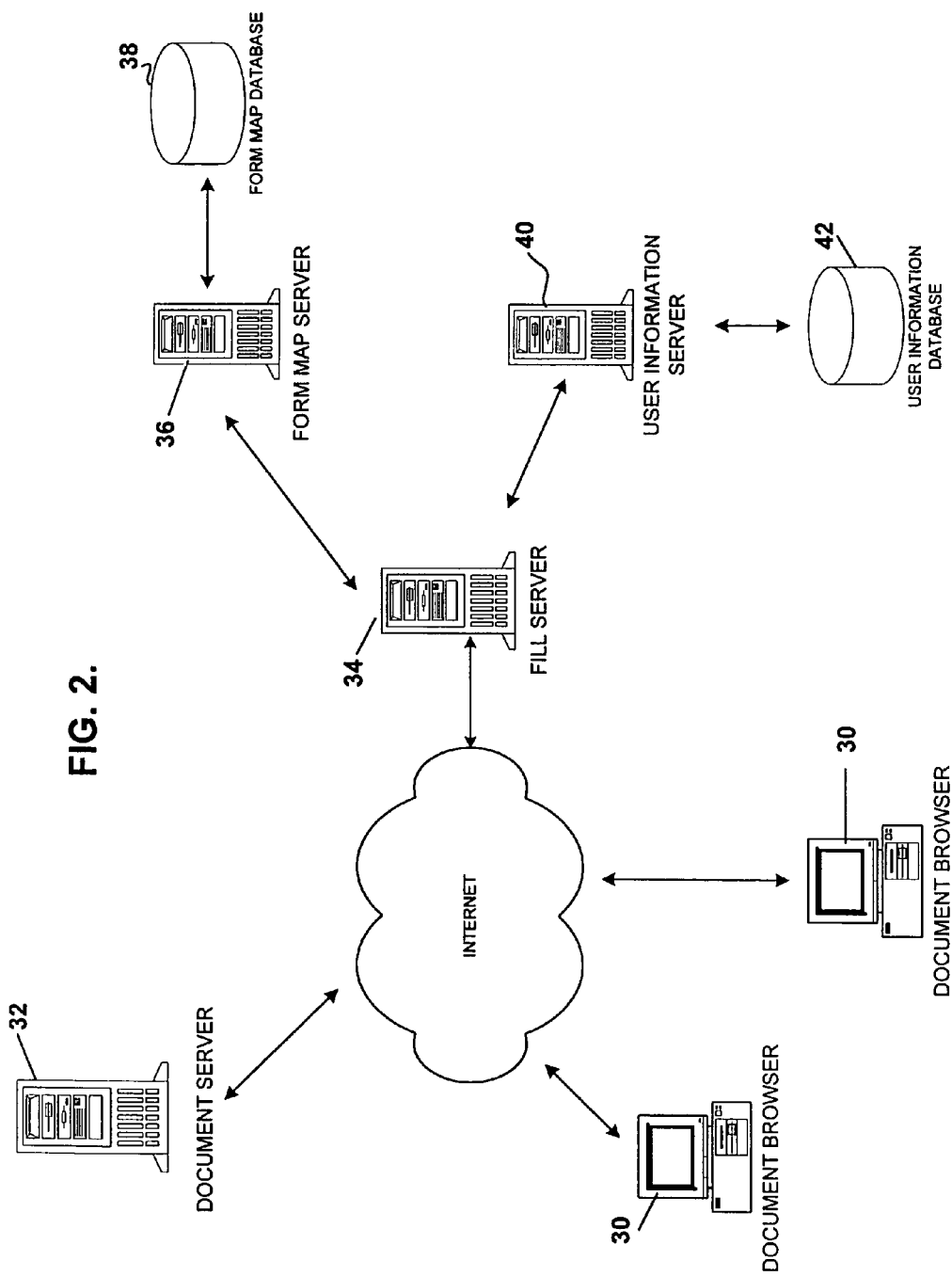
FIG. 2 is a block diagram showing an illustrative operating environment in accordance with the present invention.

Referring now to FIG. 2, an actual embodiment of the present invention will be described. A user computer system having a WWW browser application connects to the Internet 20 via a modem or other communication device. The user computer system is generally referred to as the document browser computer 30. The document browser computer 30 may interact with a variety of Web sites, such as a Web site provided by a document server 32 located elsewhere on the Internet 20. Because a user may utilize more than one computer system, FIG. 2 illustrates multiple document browser computers 30, which may be remote from one another. Generally, the document browser computer 30 connects to the Internet 20 via a modem or other communication device. The document browser computer 30 may also comprise another type of computing device such as a palm-top computer, personal digital assistant or the like.

Also connected to the Internet 20 is a fill server computer system 34. As will be explained in greater detail below, the fill server 34 is in communication with a form map server 36 having access to a form database 38 containing one or more electronic form maps. Additionally, the fill server 34 is also in communication with a user information server 40 having access to a user information database 42 containing one or more user profiles. As would be generally understood by one skilled in the relevant art, the fill server 34 may be remote from the form map server 36 and/or the user information server 40. Moreover, the combination of one or more computer systems to provide the functions of the either the fill server 34, the form map server 36 and/or the user information server 40 is considered to be within the scope of the present invention.

The present invention is directed toward the acquisition, by a document browser computer 30, of one or more electronic forms from a document server 32. Additionally, the present invention is further directed toward the generation of a fill bundle icon corresponding to the merging of user specific information with the required data fields of the electronic form. Utilizing a graphical interface, the fill server 34 generates the fill bundle icon within the WWW browser 70 of the document browser computer 30 that can be selected, dragged and deposited on a graphical window containing the electronic form to automatically complete the fields on the form corresponding the user data stored in the user information database 42.

Figure 3:
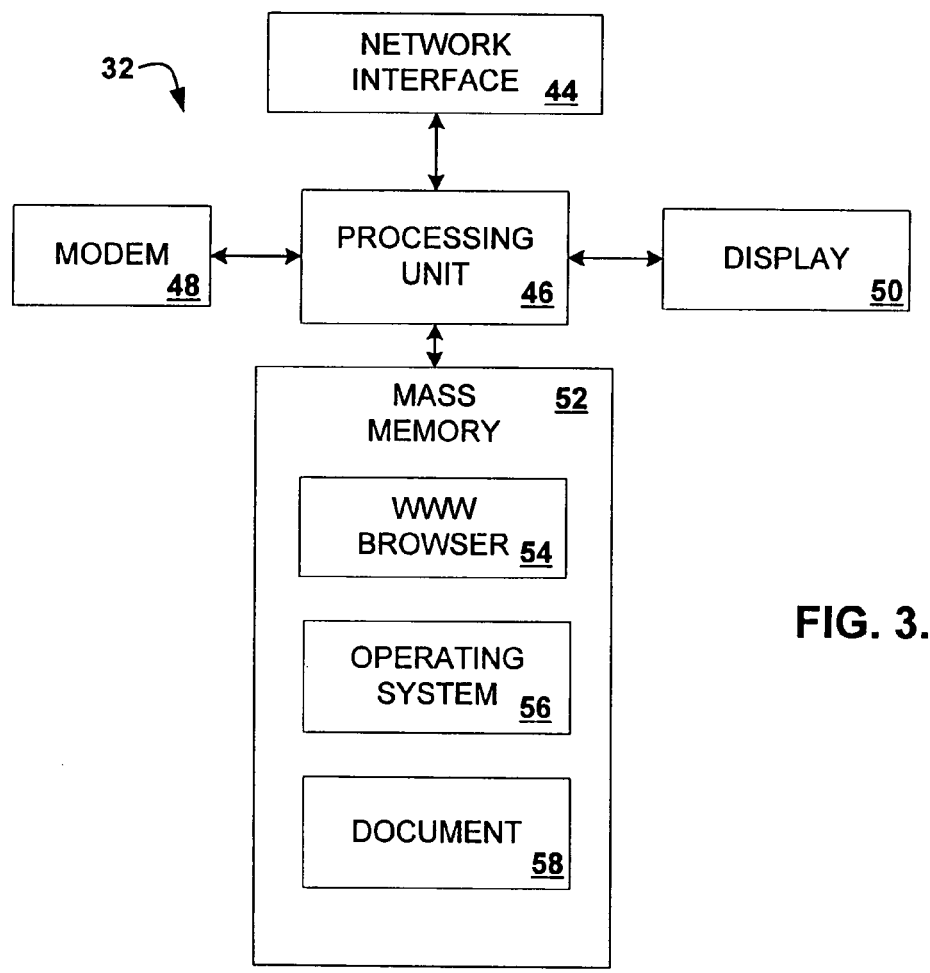
FIG. 3 is a block diagram depicting an illustrative architecture for a computer system utilized to provide an electronic document in accordance with the present invention.

FIG. 3 is a block diagram depicting an illustrative architecture for a document server 32 (FIG. 2) utilized to provide an electronic document in accordance with the present invention. Those of ordinary skill in the art will appreciate that the document server 32 includes many more components then those shown in FIG. 3. However, it is not necessary that all of these generally conventional components be shown in order to disclose an illustrative embodiment for practicing the present invention. Moreover, although the computer system described in FIG. 3 is described as a server, it will be appreciated that the function of the document server may be implemented by computer systems not generally classified as server-type computer systems. Further, although only one document server 32 is depicted in FIG. 2, it will be appreciated that other document servers 32 may be located elsewhere on the Internet 20 and utilized to serve electronic forms and documents to a user's document browser computer 30.

As shown in FIG. 3, the document server 32 includes a network interface 44 for connecting directly to a LAN or a WAN, or for connecting remotely to a LAN or WAN. Those of ordinary skill in the art will appreciate that the network interface 44 includes the necessary circuitry for such a connection, and is also constructed for use with the TCP/IP protocol, the particular network configuration of the LAN or WAN it is connecting to, and a particular type of coupling medium. Additionally, the document server 32 may also be equipped with a modem 48 for connecting to the Internet 20 through a point to point protocol ("PPP") connection or a SLIP connection as known to those skilled in the art.

The document server 32 also includes a processing unit 46, a display 50, and a mass memory 52. The mass memory 52 generally comprises a random access memory ("RAM"), a read-only memory ("ROM") and a permanent mass storage device, such as a hard disk drive, tape drive, optical drive, floppy disk drive, or combination thereof. The memory 52 stores an operating system 56 for controlling the operation of the document server 32. It will be appreciated that the operating system component 56 may comprise a general-purpose server operating system as is known to those of ordinary skill in the art, such as UNIX, LINUX™, or Microsoft WINDOWS NT®.

The memory 52 also includes a WWW browser 54, such as Netscape's NAVIGATOR® or Microsoft's Internet Explorer browsers, for accessing the WWW. Additionally, the memory 52 further includes one or more electronic documents 58 which are to be provided to users on the WWW via the WWW browser 54. It will be appreciated that these components may be stored on a computer-readable medium and loaded into memory 52 of the document server 32 using a drive mechanism associated with the computer-readable medium, such as a floppy, CD-ROM or DVD-ROM drive. The memory 52, network interface 44, display 50, and modem 48 are all connected to the processing 46 unit via one or more buses. As would be generally understood, other peripherals may also be connected to the processing unit in a similar manner.

Figure 4:
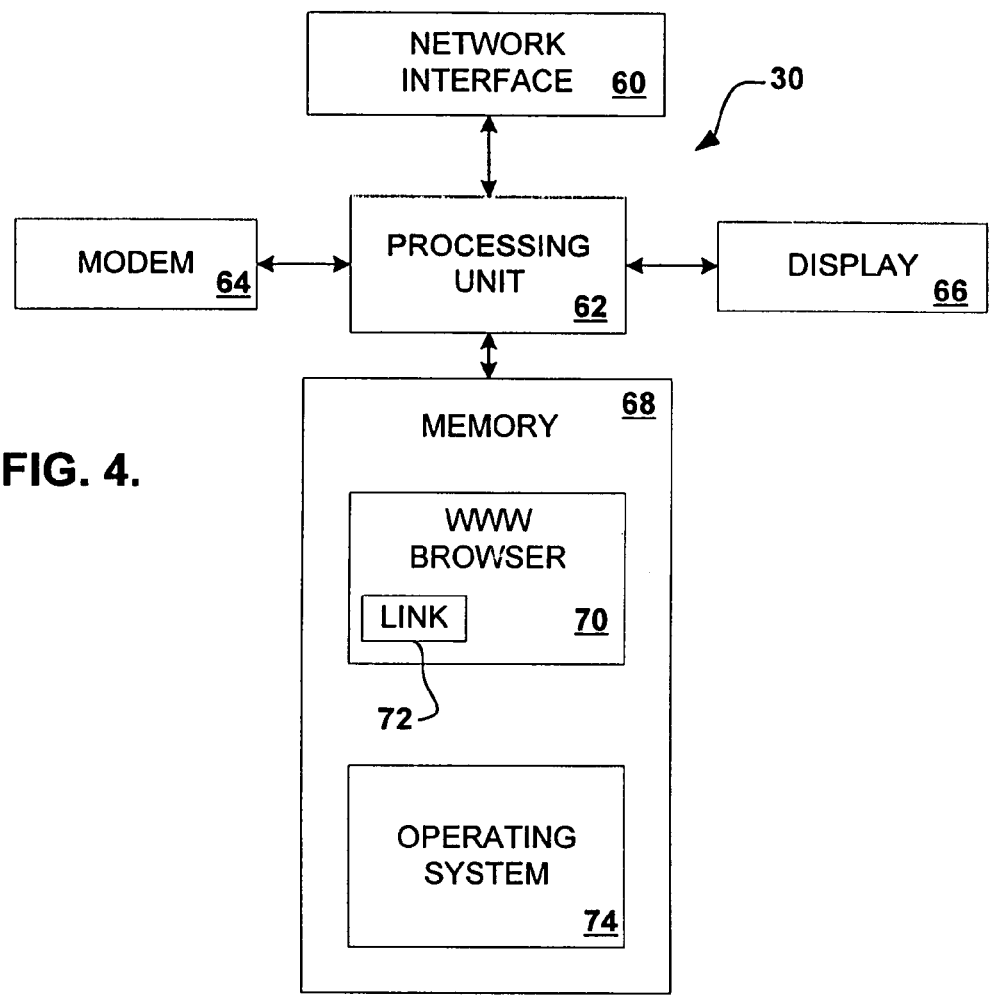
FIG. 4 is a block diagram depicting an illustrative architecture for a computer system having a WWW browser for accessing an electronic document in accordance with the present invention.

FIG. 4 is a block diagram depicting an illustrative architecture for a document browser computer 30 (FIG. 2) utilized to access and manipulate an electronic document in accordance with the present invention. Those of ordinary skill in the art will appreciate that the document browser computer 30 includes many more components then those shown in FIG. 4. However, it is not necessary that all of these generally conventional components be shown in order to disclose an illustrative embodiment for practicing the present invention.

As shown in FIG. 4, the document browser computer 30 includes a network interface 60 for connecting directly to a LAN or a WAN, or for connecting remotely to a LAN or WAN. Those of ordinary skill in the art will appreciate that the network interface 60 includes the necessary circuitry for such a connection, and is also constructed for use with the TCP/IP protocol, the particular network configuration of the LAN or WAN it is connecting to, and a particular type of coupling medium. The document browser computer 30 may also be equipped with a modem 64 for connecting to the Internet through a point to point protocol ("PPP") connection or a SLIP connection as known to those skilled in the art.

The document browser also includes a processing unit 62, a display 66, and a memory 68. The memory 68 generally comprises a random access memory ("RAM"), a read-only memory ("ROM") and a permanent mass storage device, such as a disk drive. The memory 68 stores an operating system 74 for controlling the operation of the document browser computer 30. In once actual embodiment of the invention, the operating system 74 provides a graphical operating environment, such as Microsoft Corporation's WINDOWS® graphical operating system in which activated application programs are represented as one or more graphical application windows with a display visible to the user. The memory 68 also includes a WWW browser 70, such as Netscape's NAVIGATOR® or Microsoft's Internet Explorer browsers, for accessing the WWW. As will be explained in greater detail below, the WWW browser 70 includes a link 72 corresponding to a URL of a fill server 34 in accordance with the present invention. It will be appreciated that these components may be stored on a computer-readable medium and loaded into the memory 68 of the document browser computer 30 using a drive mechanism associated with the computer-readable medium, such as a floppy, CD-ROM or DVD-ROM drive. The memory 68, network interface 60, display 66, and modem 64 are all connected to the processing 62 unit via one or more buses. As would be generally understood, other peripherals may also be connected to the processing unit in a similar manner.

Figure 5:
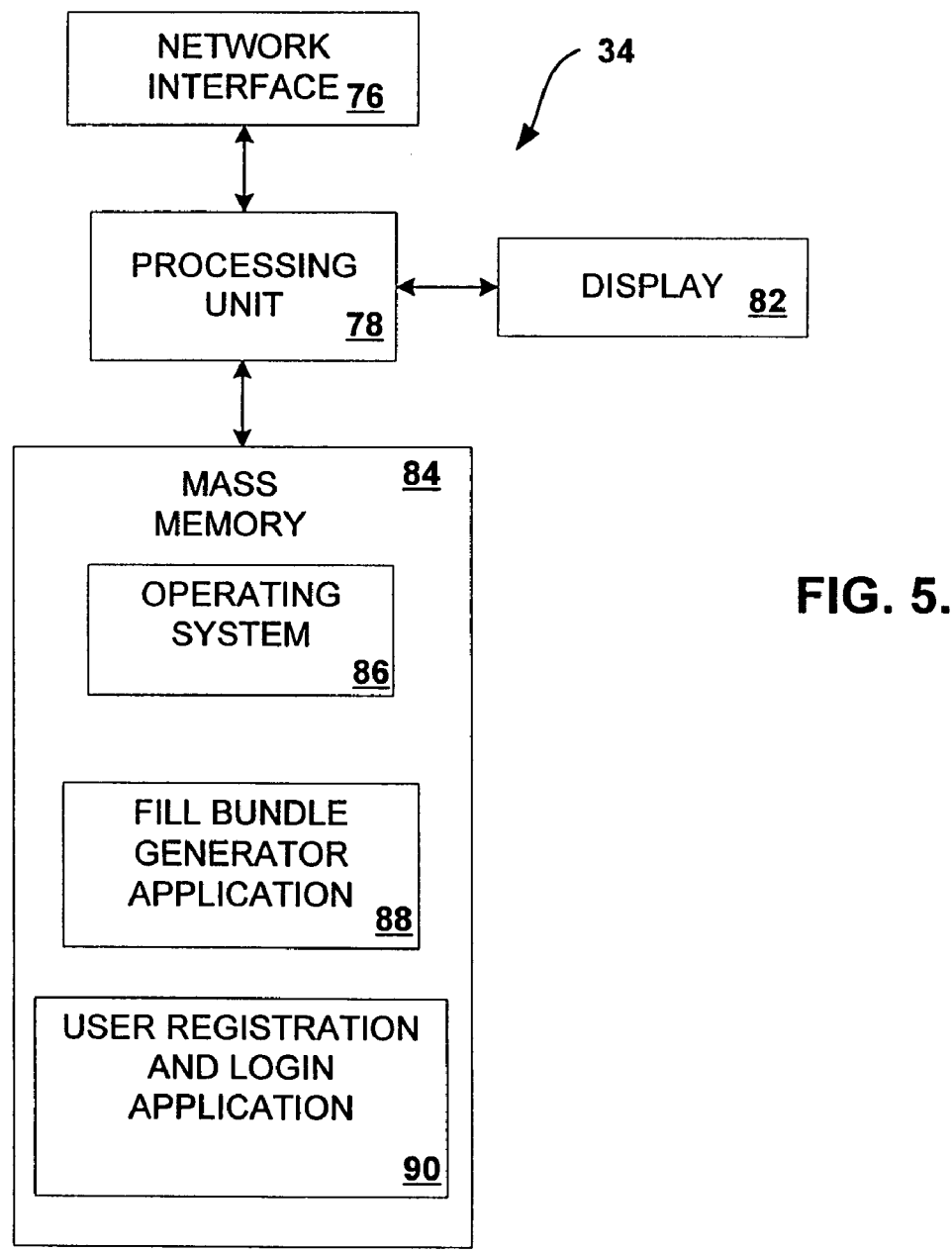
FIG. 5 is a block diagram depicting an illustrative architecture of a computer system utilized to generate and transmit a fill bundle in accordance with the present invention.

FIG. 5 is a block diagram depicting an illustrative architecture for a fill server 34 (FIG. 2) utilized to generate and transmit a fill bundle in accordance with the present invention. Those of ordinary skill in the art will appreciate that the fill server 34 includes many more components then those shown in FIG. 5. However, it is not necessary that all of these generally conventional components be shown in order to disclose an illustrative embodiment for practicing the present invention. As shown in FIG. 5, the fill server 34 is connected to the Internet 20 via a network interface 76. Those of ordinary skill in the art will appreciate that the network interface 76 includes the necessary circuitry for connecting the fill server 34 to the Internet 20, and is constructed for use with the TCP/IP protocol.

The fill server 34 also includes a processing unit 78, a display 82, and a mass memory 84, all connected via a communication bus, or other communication device. The mass memory 84 generally comprises a RAM, ROM, and a permanent mass storage device, such as a hard disk drive, tape drive, optical drive, floppy disk drive, or combination thereof. The mass memory 84 stores an operating system 86 for controlling the operation of the fill server 34. It will be appreciated that this component may comprise a general-purpose server operating system as is known to those of ordinary skill in the art, such as UNIX, LINUX™, or Microsoft WINDOWS NT®.

The mass memory 84 also stores the program code and data for registering and logging-in users and for generating fill bundles in accordance with the present invention. More specifically, the mass memory 44 stores a fill bundle generator application program 88 formed in accordance with the present invention for creating a fill bundle corresponding to a merger of an electronic form and a user profile. The fill bundle generator application 88 comprises computer executable instructions which, when executed by the fill server 34, generates one or more WWW browser displays as will be explained in greater detail below. Mass memory 84 also stores a user registration and login application 90 for registering new users or logging registered users. The operation of the user registration and login application 90 will be described in greater detail as described below. It will be appreciated that these components may be stored on a computer-readable medium and loaded into the memory 84 of the fill server 34 using a drive mechanism associated with the computer-readable medium, such as a floppy, CD-ROM or DVD-ROM drive.

Figure 6:
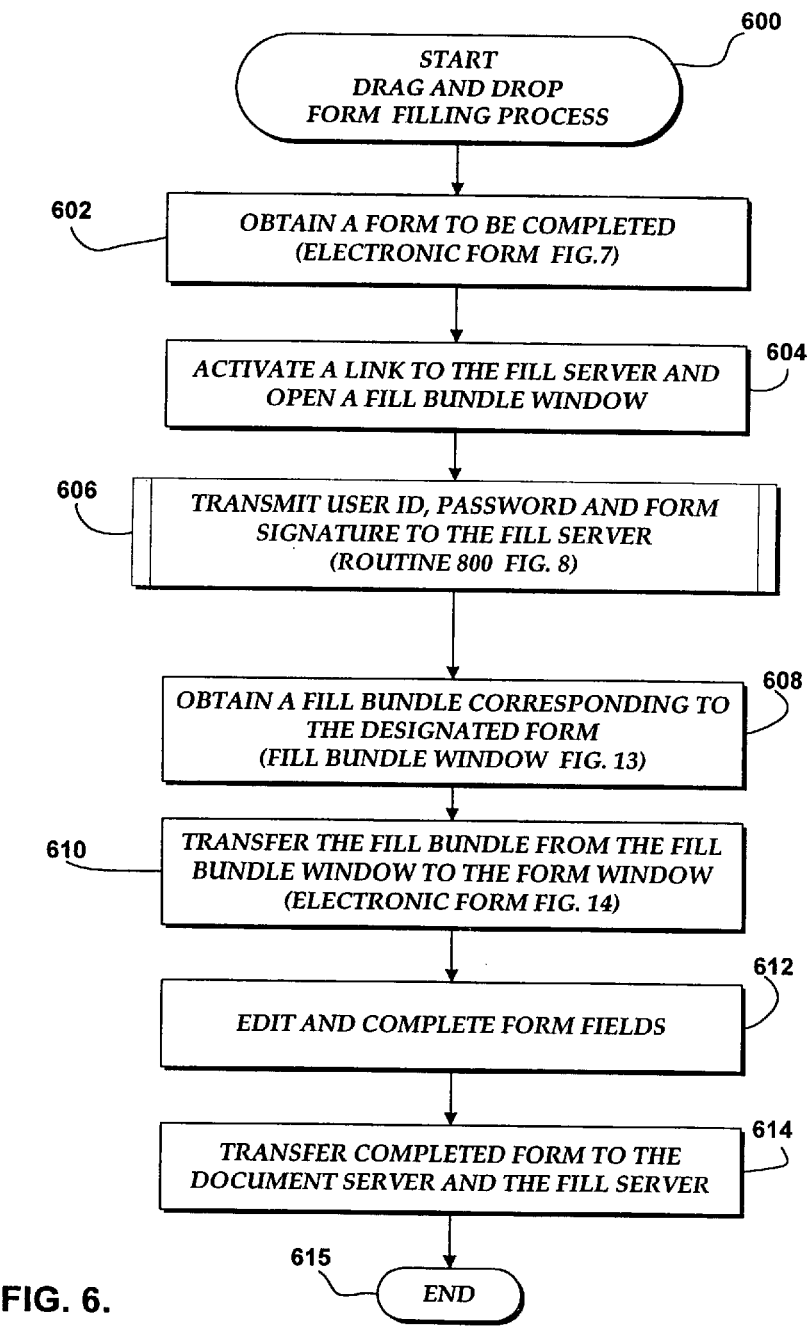
FIG. 6 is a flow diagram illustrative of a routine implemented by the document browser computer of FIG. 4 for completing one or more fields of an electronic form.
Figure 7:
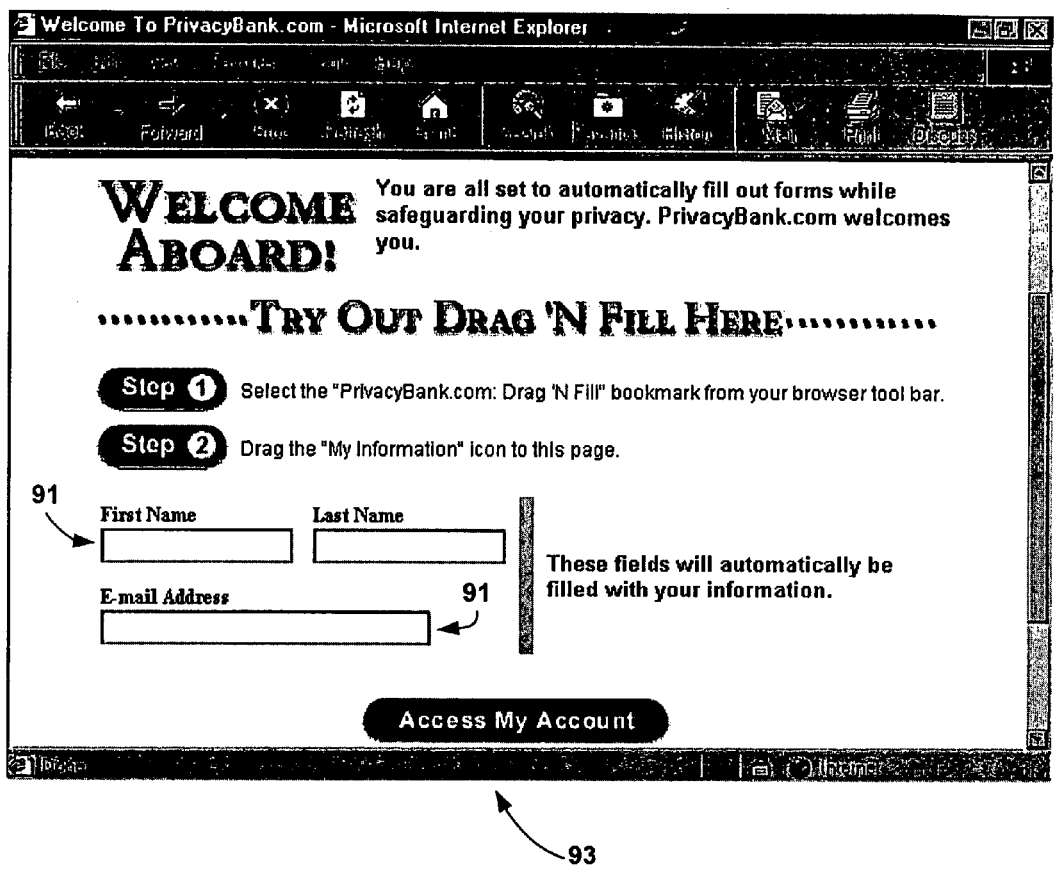
FIG. 7 is illustrative of a window produced by a WWW browser installed on the document browser computer of FIG. 4 embodying an electronic form to be completed by a user.

Referring now to FIG. 6, a flow diagram illustrative of a routine 600 implemented by the document browser computer 30 for completing one or more fields of an electronic form will be described. The routine 600 begins at block 602, where an electronic form is obtained by the Web browser 70 on the document browser computer 30. The electronic form may be downloaded directly from the Internet 20, can be recalled from a previous download, or may be transmitted via an intermediary. FIG. 7 is illustrative of a window 93 produced by a WWW browser 70 presenting an electronic form acquired from the Internet 20. The form generally includes one or more fields of information 91, which the user is required to complete and submit to the content provider to gain access to additional Web sites or to initiate a service being provided to user.

With continued reference to FIG. 6, at block 604 the user activates a URL link 72 (FIG. 4) to the fill server 34 causing a fill server application window to be generated. The fill server application window allows the user to obtain the information necessary to complete the electronic form in accordance with the present invention. It will be appreciated that the WWW browser 70 on the document browser computer 30 preferably includes some feature that allows a user to save a preferred fill server Web site URL for faster access. Often, the link may be provided as a graphical drop down menu allowing a user to click on a textual/graphical representation of the link causing the URL to be automatically entered into the WWW browser 70.

Regardless of how the link is activated, the user transmits at block 606 a user ID and password to the fill server 34 via an input screen and login sequence illustrated in FIG. 8 and described in detail below. Alternatively, as will be explained below, if the user has previously logged in to the fill server 34, the user ID and password may be automatically transferred to the fill server 34. With continued reference to block 606, the document browser computer 30 also transmits a form signature of the electronic form to be completed. A form signature is a text string which can include data such as the URL where the electronic form is found, the label descriptors of one or more of the form's fields and a descriptor of the action requested by the form provider. The form signature is utilized by the fill server to create a form map for the creation of a fill bundle corresponding to the form.

Figure 8:
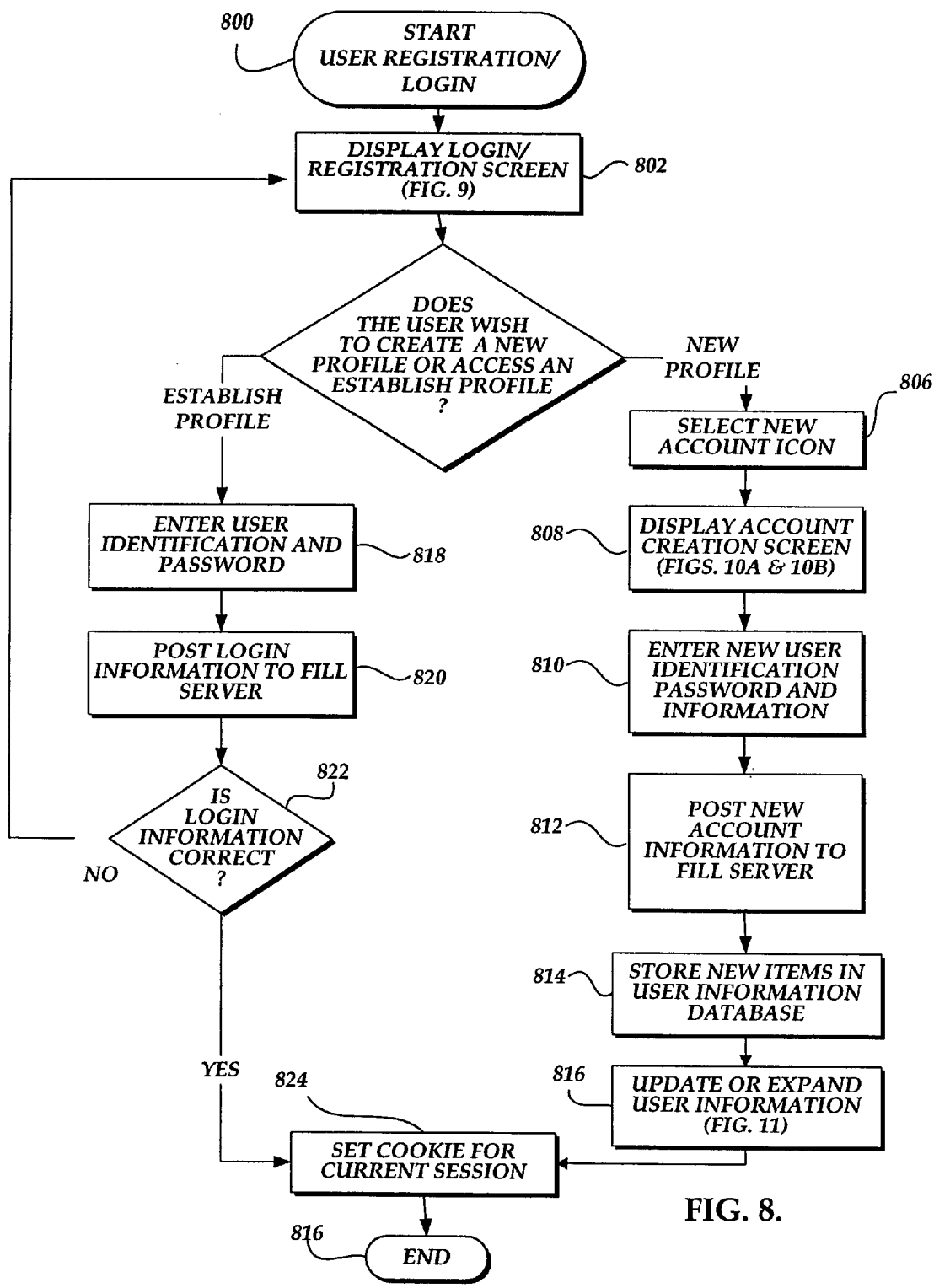
FIG. 8 is a flow diagram illustrative of a routine implemented by the fill server computer system of FIG. 5 for registering and/or logging in a user.
Figure 9:
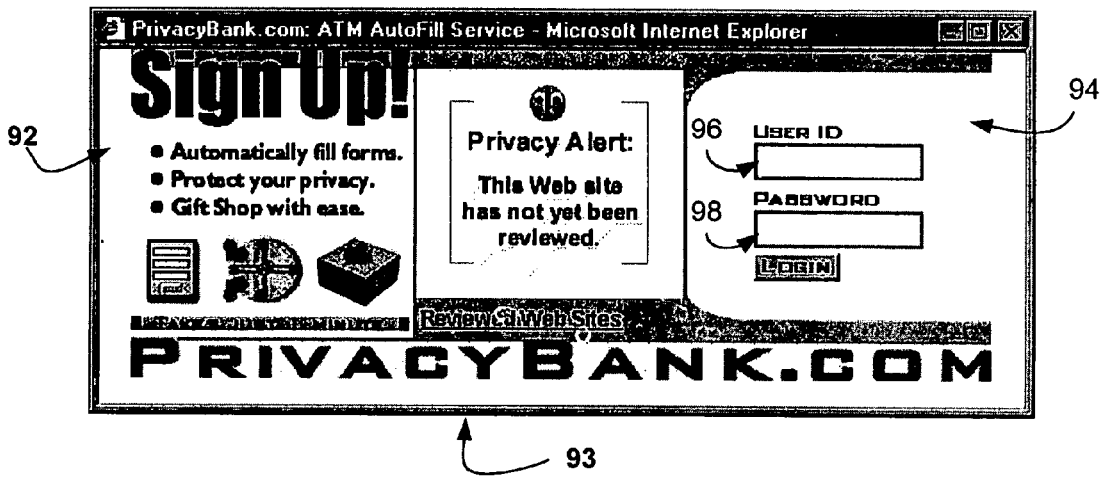
FIG. 9 is illustrative of a window produced by a WWW browser installed on the document browser computer of FIG. 4 for registering or logging in a user.

FIG. 8 is illustrative of a login/registration routine 800 implemented by user registration and login application 90 of the fill server 34 to process the user ID and password transmitted by the document browser computer 30 at block 608 of FIG. 6. Routine 800 begins at block 802 with the display of a login/registration screen on the user's display. As implemented in a graphical operating environment, an application window housing the login/registration screen is displayed in the fill server application window generated at block 604 (FIG. 6). FIG. 9 is illustrative of a login/registration screen 95 generated by the WWW browser 70 on the document browser computer 30. In this embodiment, the login/registration screen 95 includes a registered user login portion 94 having a field for the user to enter a user ID 96 and a field to enter a password 98. The login portion 94 allows a user to access their specific user profile from any WWW browser having access to the fill server URL. The login/registration screen 95 also includes a new registration portion 92 which allows a user to utilize create a new user profile.

With continued reference to FIG. 8, at decision block 804, a determination is made whether the user wishes to create a new user profile or access an existing user profile. With reference to FIG. 9, such a determination can be made by whether the user enters an ID and a password at the login portion 94, or whether the user clicks on the new registration portion 92. If at block 804 the user wishes to create a new user profile, a new account registration icon 92 (FIG. 9) is selected at block 806 and the fill sever application window on the WWW browser 70 displays a profile creation screen 99 at block 808.

A data entry interface is provided for allowing a new user to complete an initial user profile. The interface allows the user to enter his or her initial contact information such as first and last name, a contact e-mail address, a user ID, password 108, and the like. In one embodiment, the data entry interface entails the minimum amount of information required to be entered by the user to have a registration. As would be readily understood by one skilled in the art, the amount and type of data required in the initial user registration would vary dependent on the type of user and the services intended purpose.

The data entry interface further allows the user to indicate the level of security the user wishes to assign his or her profile information. In one embodiment, the user is presented with a choice of a limited, moderate or extensive privacy guard of the user information. The indication of one of these three levels will be then used by the fill server 34 to determine whether a form field will be automatically completed dependent on the proposed use by the form vendor. For example, some proposed uses of profile information include for personalization of a Web site, for completion of an activity such as an e-commerce transaction or for system administration. If a user selects an extensive security level, the fill server 34 would be prevented from using the user's profile to complete fields for Web site personalization, but could use the profile for completing fields required to effect an electronic transaction. As would be readily understood, various security configurations and/or intended uses could be incorporated into the registration process.

Figure 10:
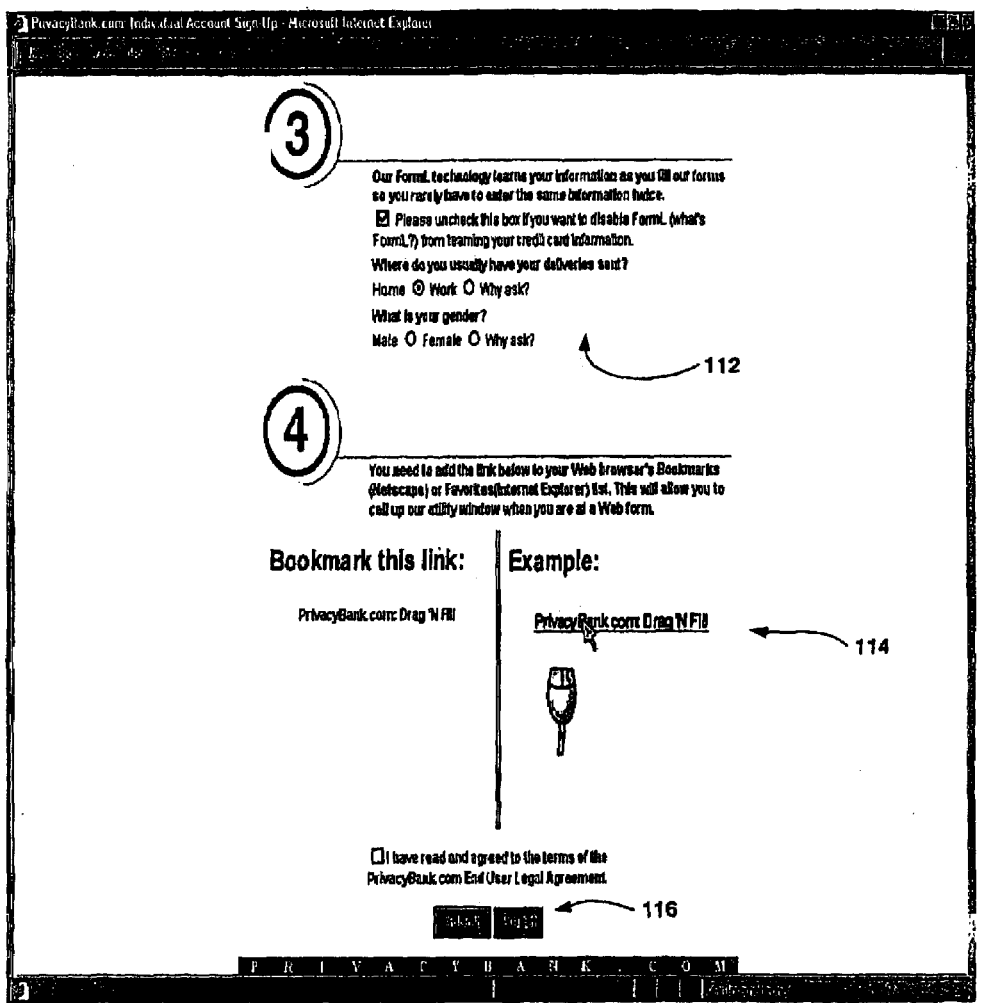
FIG. 10 is illustrative of a window produced by a WWW browser installed on the browser computer of FIG. 4 for completing an initial registration of a user.

With reference to FIG. 10, in a third portion 112 of the profile creation screen 99, the user is prompted for additional information that allows the fill server 34 to further develop the user profile. Such information can include the user's gender and whether the fill server service is being used for work or home use. As would be readily understood, additional or modified fields in the third portion 112 would be considered to be within the scope of the present invention. Moreover, in an alternative embodiment, the third portion 112 may be omitted completely without changing the function of the profile creation window.

With continued reference to FIG. 10, the profile creation screen 99 includes a fourth portion 114 prompting the user to save the fill server URL into their WWW browser 70. In one actual embodiment, the user is required to manually save the URL via their standard browser procedure. In an alternative embodiment, this function may be performed automatically in the profile creation process. The initial profiled creation screen 99 also includes a submit/cancel button 116 allowing a user to send the initial registration data to the fill server 34 upon its completion or to cancel the registration process.

Returning to FIG. 8, at block 810, the user enters the required data and the entered information is posted to the fill server 34 at block 812. At block 814, the fill server 34 receives the new registration information and establishes a user profile. With reference to FIG. 2, the fill server 34 communicates the profile registration information to the user information server 40 which stores the information under the user ID in the user information database 42.

Figure 11:
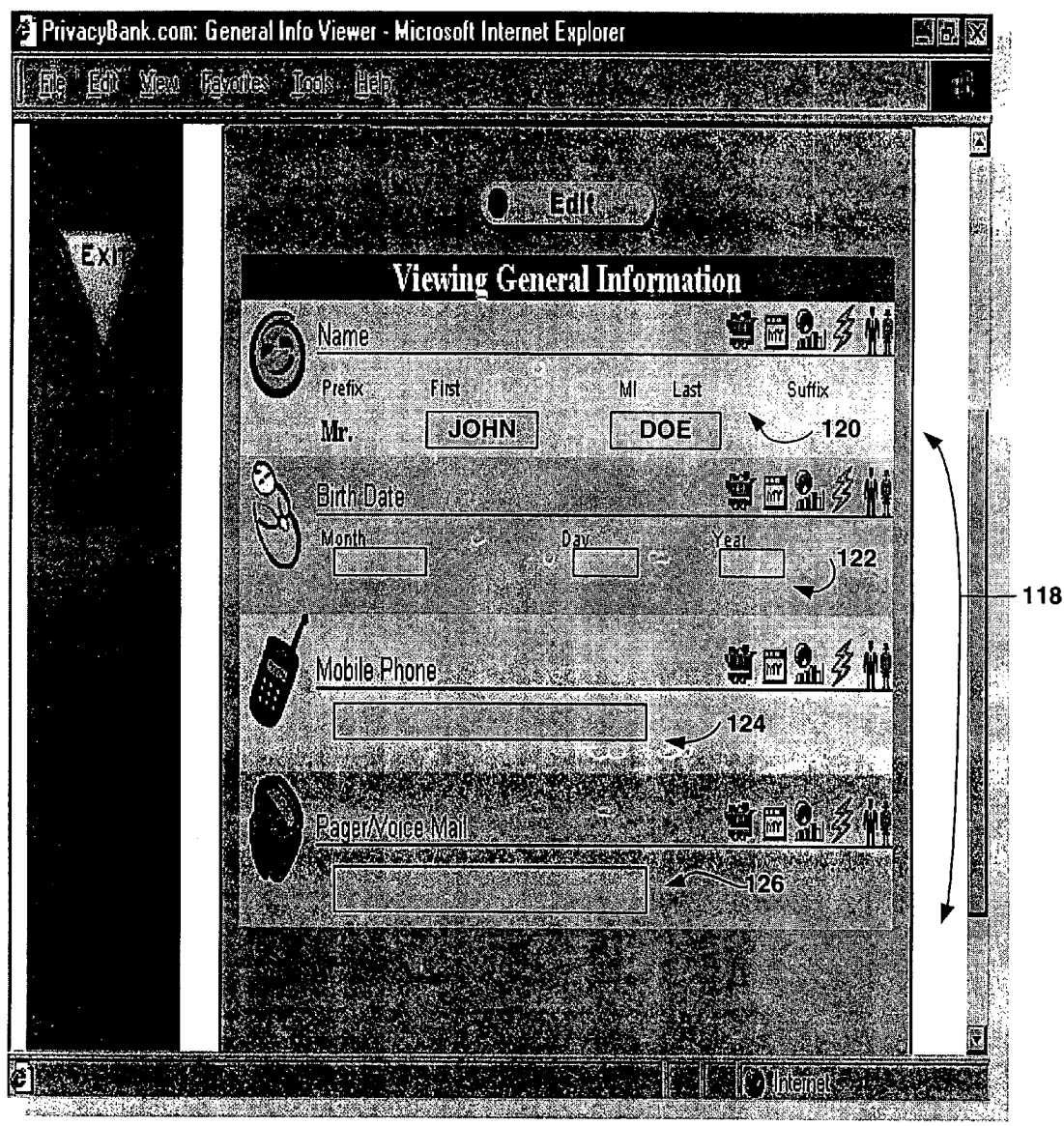
FIG. 11 is illustrative of a window produced by a WWW browser installed on the document browser computer of FIG. 4 for modifying and/or expanding a user's personal information.

Having established a new profile, at block 816, the user is given the opportunity to complete additional fields of data within the profile that may be utilized to complete electronic forms. FIG. 11 is illustrative of a window 117 displayed by a WWW browser 70 on a document browser computer 30 and generated by a fill server 34 for modifying and/or expanding a user's profile. In this window 117, the user is presented with additional grouping of fields 118 to complete, such as a full name field 120, a birth date field 122, a mobile phone field 124 and a pager/voice mail field 126. By scanning through the information, the user has the opportunity to select which of these fields will be completed.

Figure 12:
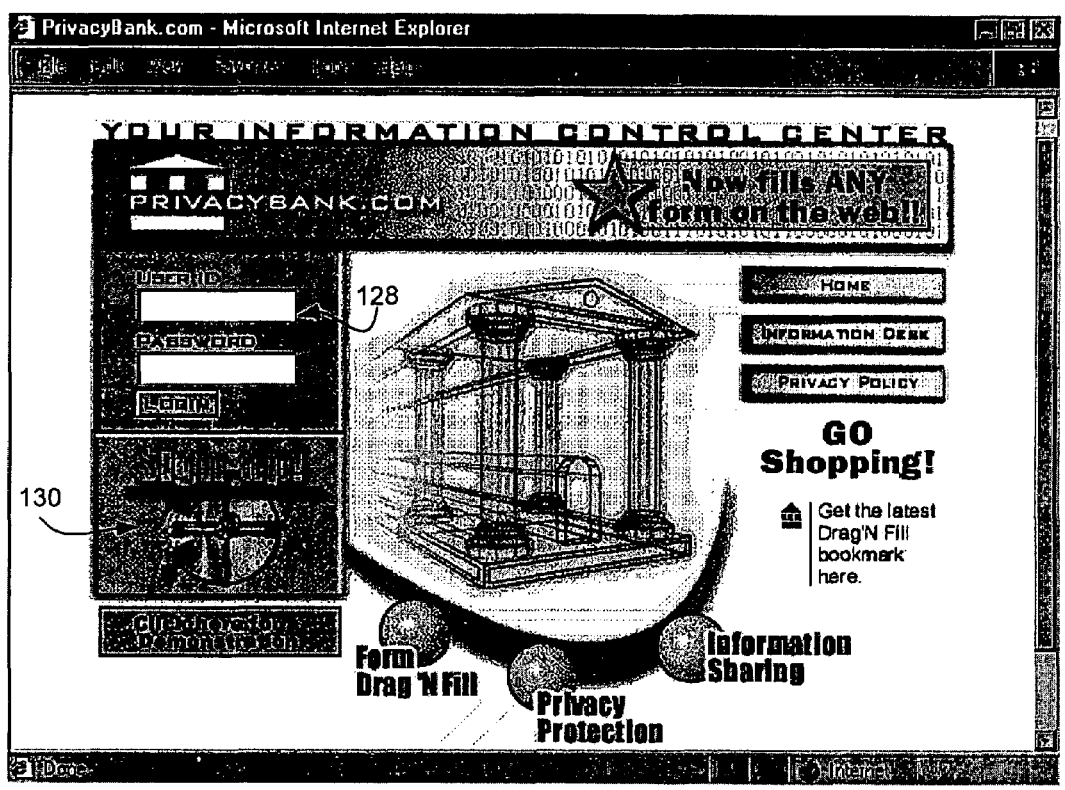
FIG. 12 is illustrative of a window produced by a WWW browser installed on the document browser computer of FIG. 4 as a registration/login for a user.

In an alternative embodiment illustrated in FIG. 12, a user may access a separate fill server Web site at any point after the creation of a user profile for the purpose of updating/expanding the profile. Similar to the login screen of FIG. 9, the login window 127 includes a user ID and password 128 field and a new user registration field 130. Upon logging in, the user is presented with the update/modify window 127 of FIG. 11 and completes the information in the manner described above.

Returning to FIG. 8, once the user has completed entering additional information at block 816, or if the user does not choose to enter in additional information, the fill server 34 provides a cookie to be deposited into the WWW browser 70 of the document browser computer 30 at block 824. As is generally understood, a cookie is a user specific identifier containing state information assigned to the user whenever the user connects to a content provider's resource. The cookie is deposited into the WWW browser 70 and the WWW browser 70 is instructed to show the cookie's state information to the resource upon subsequent visits to the fill server 34.

Cookies generally facilitate the customization of Web sites for users and are vital to the implementation of multiple, composite Web sites. Some resources assign temporary cookies, which expire at the end of a session or when the browser application is terminated. Other cookies, however, are assigned for a longer duration facilitating identification beyond a single network session. The more permanent cookies can be used to identify user-specific network history and to relay configuration preferences on a repeated basis. Generally, the transmittal of the information from the user computer system to the content provider is transparent to the user.

In one actual embodiment, at block 824, the fill server 34 deposits a temporary cookie which will only be valid during the current browser session. The use of temporary cookies prevent a second user from accessing the first user's login data once the first user terminates the browser session. Alternatively, the fill server 34 may deposit more permanent cookies in the WWW browser 70 for continuous access to the user login information. Upon setting the cookie at block 824, the routine 800 terminates at block 825.

Returning to decision block 804 of FIG. 8, if a determination is made that the user wishes to access an existing user profile, the user enters his or her user ID and password at block 818. The information is posted to the fill server 34 at block 820, which will determine whether the login information is correct at decision block 822. With reference to FIG. 2, the fill server 34 polls the user information server 40 to verify that the user ID and password match with one of the user profile accounts stored in the user information database 42. If at block 822 the login information is not correct, the routine returns to block 802 displaying the login/registration screen 95 (FIG. 9). Alternatively, if at block 822 the login information is correct, the fill server 34 provides a cookie to be deposited into the WWW browser 70 of the document browser computer 30 at block 824 and the routine 800 terminates at block 825.

Returning to FIG. 6, after the user ID, password and form signature have been passed to the fill server at block 606, the document browser computer 30 obtains a representation of a fill bundle corresponding to the designated form from the fill server 34 at block 608. In an actual embodiment, the fill bundle includes a shippable code segment containing a merger of raw user data from a user profile and a form map corresponding to the electronic form to be completed. Additionally, the shippable code segment includes commands, which when merged into a WWW browser application window, causes one or more fields to be completed. The generation of the fill bundle by the fill server 34 is described in more detail below in connection with FIG. 15.

Figure 13:
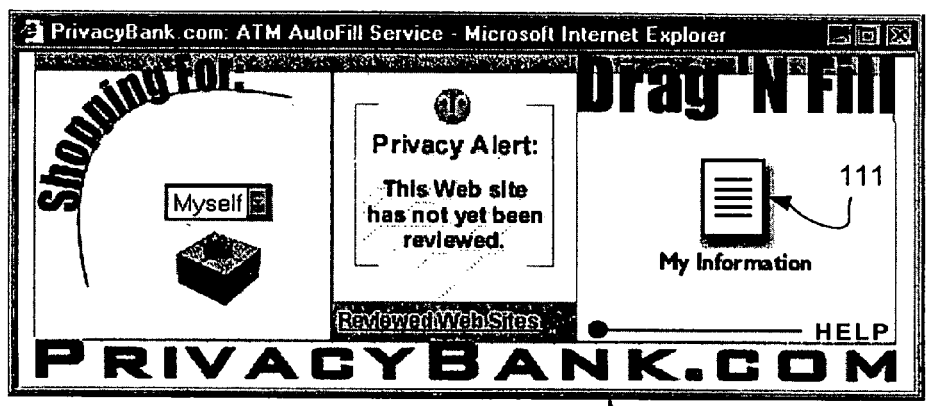
FIG. 13 is of a window produced by a WWW browser installed on the document browser computer of FIG. 4 presenting a user with a fill bundle icon in accordance with the present invention.

FIG. 13 illustrates a window 110 displayed by the WWW browser 70 of the document browser computer 30 and generated by the fill server 34 in accordance with the present invention. In the illustrated embodiment, the window 110 is very similar to the login/registration screen 95 of FIG. 9 except that the user login portion 94 (FIG. 9) has been replaced by an icon 111 labeled "My Information". In this embodiment, the icon 111 provides the user with the ability to access the fill bundle generated by the fill server 34 as will be described in more detail below.

Figure 14A:
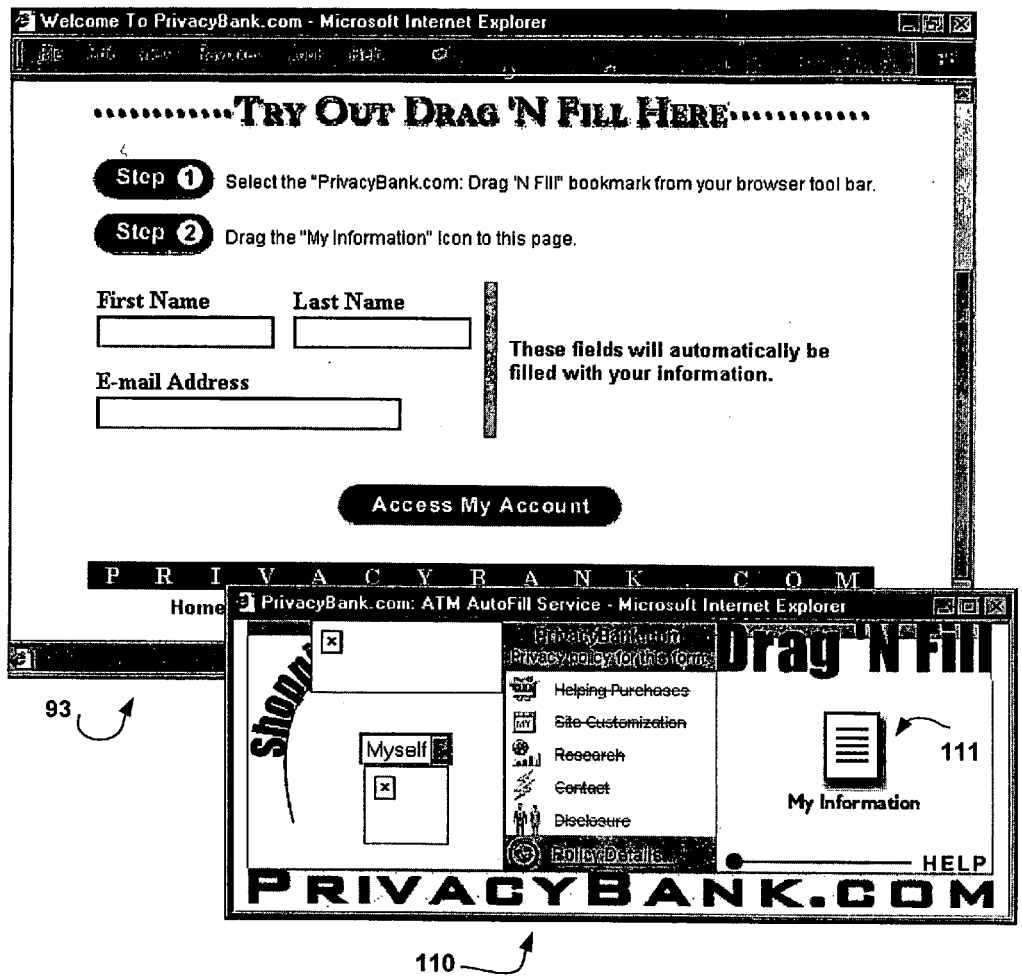
FIGS. 14A and 14B are illustrative of the interaction between the electronic form window of FIG. 7 and the fill bundle window of FIG. 13 in accordance with the present invention.
Figure 14B:

With continued reference to FIG. 6, once the Web browser 70 of the document browser computer 30 obtains and displays the fill bundle window 110 at block 608, the user transfers the fill bundle icon 111 from the fill bundle window 110 to the electronic form application window 93 by clicking on the icon 111 and "dragging" it to the electronic form application window 93. FIGS. 14A and 14B are illustrative of the electronic form window 93 and fill bundle window 110 during the transfer of the fill bundle icon 111 to the electronic form window 93. Because of the general proximity of the two windows, the transfer of the icon 111 is accomplished by clicking on it and moving it to an area not covered by the fill bundle window 110, but covered by the electronic form application window 93. As would be understood, the action of clicking and dragging an icon in a graphical windowed operating environment is generally understood.

In the illustrative embodiment, the fill bundle is embodied in a shippable code segment in the form of a JavaScript™ program. Shippable code segments may be generally understood to represent as computer-readable instructions which can be transferred from the fill server 34 and executed by the document browser computer 30. The dragging and depositing of a JavaScript™ program causes the receiving application window to merge the program with its existing code segments thereby allowing the code to be executed in the receiving application window. In this illustration, the JavaScript™ commands are used to electronically complete the fields of the form. It will be generally understood, that once incorporated into the target application window, the specific JavaScript™ commands utilized by a WWW browser, such as WWW browser 70 of the document browser computer 30, to electronically complete a form are known. It should be further understood that because the fill bundle is transferred as shippable code, the completion of the electronic form takes place on the document browser computer 30, but does not require the document browser computer 30 to install or maintain additional software. The utilization of other forms of shippable code is considered to be within the scope of the present invention.

Figure 14C:
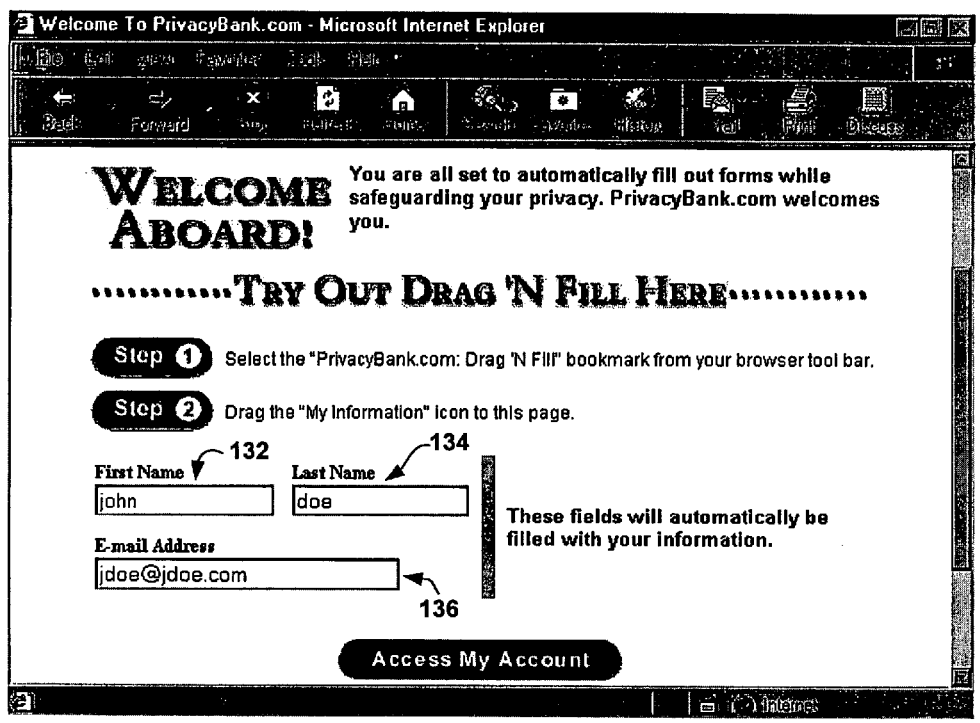
FIG. 14C is illustrative of the electronic form window of FIG. 7 after the fields have been completed in accordance with the present invention.

FIG. 14C is illustrative of the electronic form window 93 of FIG. 7 after the fields have been completed in accordance with the present invention. In this illustration, the executed fill bundle has completed the first name 132, last name 134 and e-mail address 136 fields of the form automatically.

With continued reference to FIG. 6, at block 612, the user completes any additional fields within the electronic form that the fill server 34 was unable to complete. Additionally, the user may correct or delete any of the data in the fields that were completed by the execution of the fill bundle.

Upon completion of the fields at block 612, or if the execution of the fill bundle has completed the necessary fields at block 610, the document browser computer 30 transfers the completed electronic form to the document server 32 at block 614. This is typically accomplished by the user indicating that he or she wishes to send the form by clicking on a "submit" or "send" button (or something similar).

In one actual embodiment, at block 614, the document browser computer 30 also sends a copy of the completed electronic form to the fill server 34. In this embodiment, the transfer can be transparent to the user or may require user approval. Accordingly, the fill server 34 accepts the data and verifies whether the user has entered data for fields not previously completed in the user's account, or whether the data stored on the user information database 42 needs to be updated. In this embodiment, as the user utilizes the fill server service to partially complete an electronic form, any additional data that is competed by the user after the fill bundle has been executed is automatically added to the user profile. Accordingly, continuous use of the fill server service from any document browser computer 30 maintains the user profile and allows for its expansion. The routine 600 then terminates at block 615.

Figure 15:
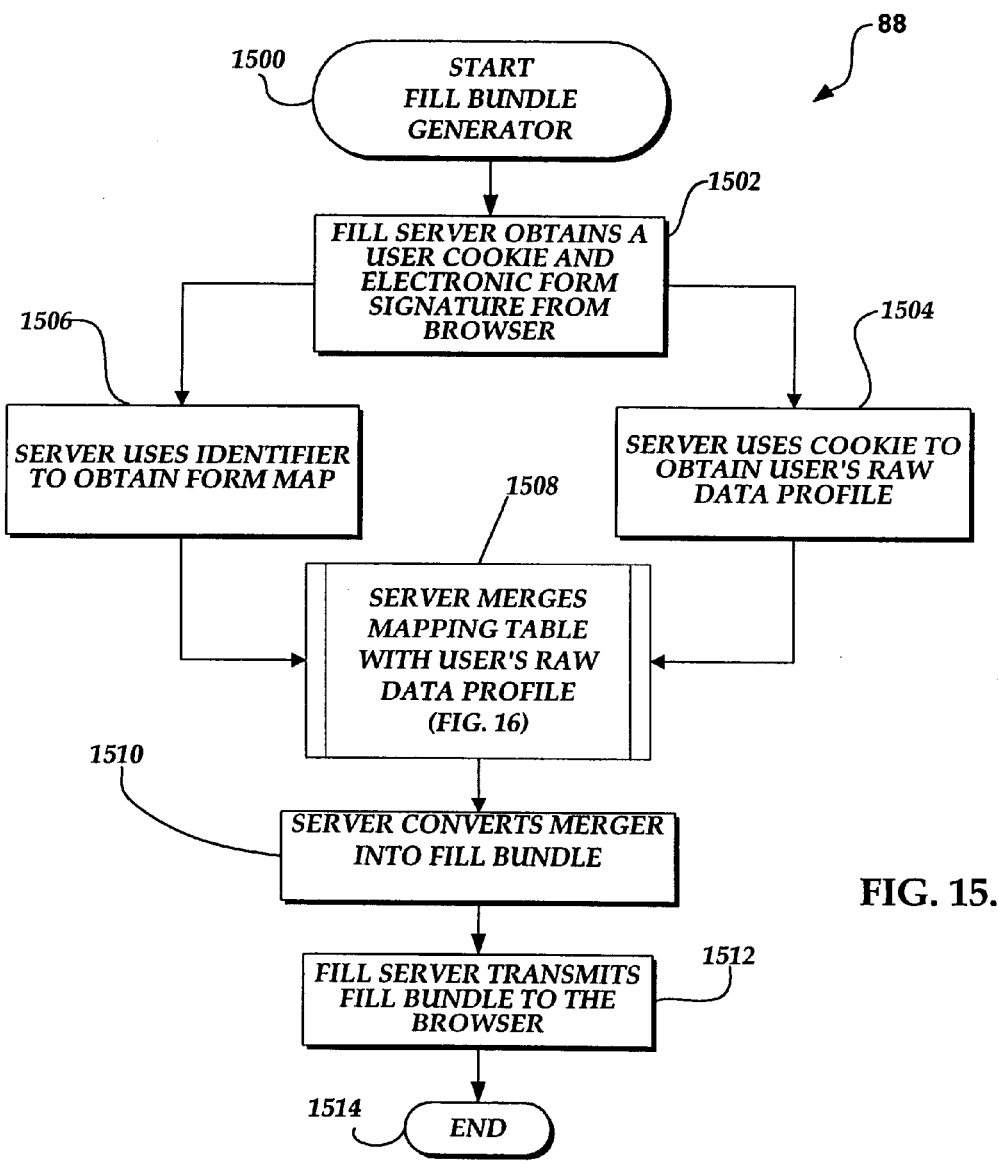
FIG. 15 is a flow diagram illustrative of a routine implemented by the fill server computer system of FIG. 5 for generating a fill bundle in accordance with the present invention.

FIG. 15 is a flow diagram illustrative of a routine 1500 implemented by the fill bundle generator application 88 of the fill server 34 for generating a fill bundle in accordance with the present invention. The routine 1500 describes the steps taken by the fill server 34 once the document browser computer 30 obtains a user cookie (either by a previous use or by the registration/login routine illustrated in FIG. 8) and is ready to transfer the information to the fill server 34 to obtain a fill bundle icon 111 (at block 608 of FIG. 6). At block 1502, the fill bundle generator application 88 obtains the user specific cookie that identifies which user profile stored in the user information database 42 will be utilized to complete the electronic form. Additionally, and as mentioned previously, the fill bundle generator application 88 obtains a document signature for the electronic form.

In the one actual embodiment, the form signature of the document can include the URL of the form, descriptors of some or all of the form fields and/or descriptors of some or all of the required actions by the user. As would be generally understood, current Internet browser capabilities limit the amount of data transferred in any URL link to 2000 characters. Accordingly, in this embodiment, the present invention creates the signature of the electronic form such that it equals less than 2000 characters. However, as would be readily understood, the limitation of the number of characters allowed in a form signature may vary dependant on the capabilities of the Internet browser.

Upon receipt of the user cookie and form signature, the fill bundle generator application 88 utilizes the user cookie to retrieve a corresponding user profile from the user information server 40 at block 1504. In this illustration, the fill bundle generator application 88 passes the user ID and password to the user information server 40 which retrieves the user profile and returns it to the fill bundle generator application 88. Additionally, and essentially parallel, at block 1506, the fill bundle generator application 88 utilizes the electronic form signature to obtain a form map of the fields of the electronic form (e.g., from the form map database 38). A form map includes the association of the specific description of the fields on the form with a standard description of the user data. For example, a specific form requiring a user name may label a field requesting a user's first name as "First Name". Additionally, the user profile data corresponding to this field is given the standard label as "user_name_first" in the user information database 42. Accordingly, the form map would associate the field "First-Name" with its standard field "user_name_first" allowing the fill bundle generator application 88 to return the appropriate user profile data. In this embodiment, the association of the specific description of the fields on the form with the standard description is referred to as a tuple.

In one actual embodiment, there are several methods of obtaining the form map. In a first method, the fill bundle generator application 88 passes the form signature to the form map server 36 which determines whether a form map for the electronic form already exists. If so, the form map is retrieved from the form map database 38 and transferred to the fill bundle generator application 88. The form maps stored in the form map database may be created by having a technician obtain and manually key in each form tuple. Although potentially time consuming, this approach increases the correctness of the form tuple association.

Often, however, electronic forms are modified on a more frequent basis. The modifications may include minor changes to the form, such how the fields are ordered or the presentation of the fields on the display. However, some modifications, such as the changing of the URL where the form is located or removing one or more fields, may alter the form sufficiently to render a previous form map incorrect or unrecognizable. In the event that the signature of an electronic form is modified sufficiently, or a manually typed form map has not been created, the fill bundle generator application 88 creates a new form map utilizing a form map generator. In this illustration, the form map generator obtains the descriptors of the form fields from the form signature and attempts to match the field descriptor with a standard field descriptor in an iterative manner. If the field descriptors do not match identically, the form map generator may make a "best guess" association utilizing factors such as partially matching field descriptor names, previous matching history and/or user preferences for best guess associations. An illustrative form map generating method and structure is described in commonly owned U.S. Nonprovisional patent application Ser. No. 09/357,530 Intelligent Mapping of Field Names in an Electronic Form with Standard FIELD NAMES, and filed Jul. 19, 1999, which is specifically incorporated herein by reference. As would be readily understood by someone skilled in the relevant art, alternative field mapping methods and structures would be considered to be within the scope of the present invention. The resulting form map may be stored in the form map database 38 for future use.

Figure 16:
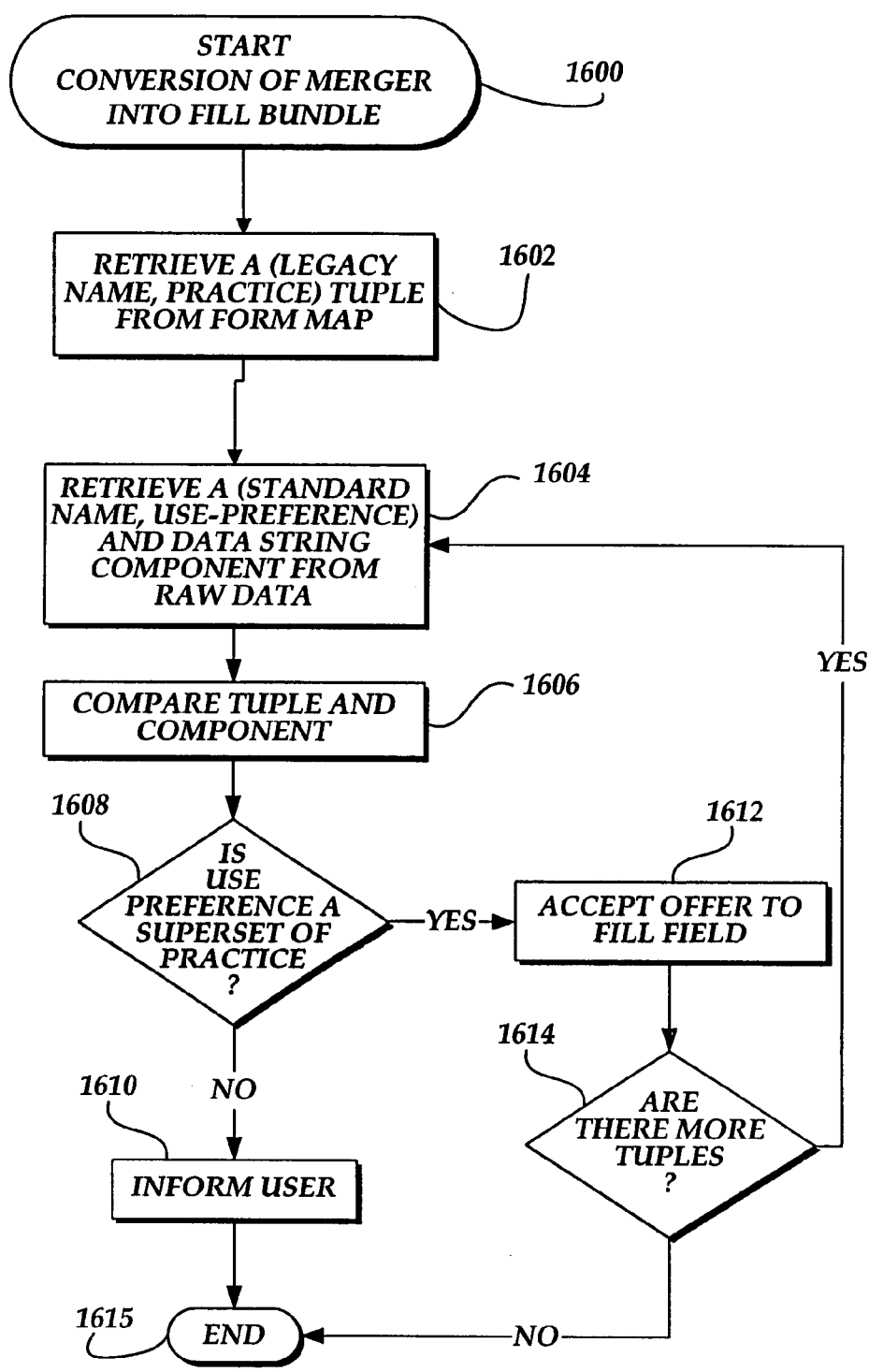
FIG. 16 is a flow diagram illustrative of the routine implemented by the fill server computer system of FIG. 5 for merging an electronic form map and raw user data into a corresponding fill bundle in accordance with the present invention.

Having obtained the form map at 1506 and the raw user data at block 1504, the fill bundle generator application 88 merges the form map and the raw user data at block 1508. FIG. 16 is a flow diagram illustrative of a sub-routine 1600 implemented by the fill bundle generator application 88 for merging a electronic form map and raw user data in accordance with the present invention. Routine 1600 begins with the fill bundle generator application 88 obtaining a tuple associating a form field descriptor and a standard user profile descriptor at block 1602. At block 1604, a corresponding user profile raw data component is retrieved. The user profile raw data component can include a field descriptor label, a data string containing the actual user profile data and a security preference associated with the data. At block 1606, the fill bundle generator application 88 compares the tuple from the form map with the raw data component and determines whether the security preference allows for the completion of the field at decision block 1608. If the user profile indicates that the corresponding field cannot be used for the requested purpose, the match will not be accepted and the user will be informed at block 1610 that data requested for that field was to be utilized for an unauthorized purpose. In one actual embodiment, if a form tuple is rejected, the fill bundle generator application 88 terminates the merger routine 1600 at block 1615 and a fill bundle is not generated. Alternatively, a fill bundle may be generated having only the accepted tuple mergers completed, giving the user the option of completing the rejected fields as described at block 612 (FIG. 6).

If at block 1608 the requested user data is authorized, the raw data string is merged with the requested field form map at block 1612. In one actual embodiment, the merged data is maintained at the fill bundle generator application 88 to be incorporated into a JavaScript™ code segment at the completion of the merging routine. Accordingly, at decision block 1614, a determination is made as to whether there are any tuples remaining in the form map. If so, the sub-routine 1600 returns to block 1608 for continued processing. If there are no further tuples at block 1618, the routine is terminated at block 1615.

With reference to FIG. 15, once the form map and the user profile raw data has been merged, the data is converted into shippable code for transmittal to the document browser computer 30 at block 1510. In one actual embodiment, the merged data is embodied in shippable code in the form of JavaScript™ commands for entering the data string into the corresponding field of the electronic form. In this actual embodiment, the shippable code is displayed graphically as the fill bundle icon 111 on the WWW browser 70 of the document browser computer 30. Accordingly, at block 1512, the fill bundle is transmitted to the document browser via the Internet 20. In the illustrative embodiment, the transfer of the user data is facilitated through the use of a Secured Socket Layer communication protocol to ensure user data security. As would be readily understood, additional or alternative security features, such as private dedicated network links or alternative security protocols could be incorporated into the system. At this point, the fill bundle generation routine 1500 is complete at block 1514 and the completion of the one or more fields of the electronic form occur without requiring further action from the fill server 34.

Figure 17:
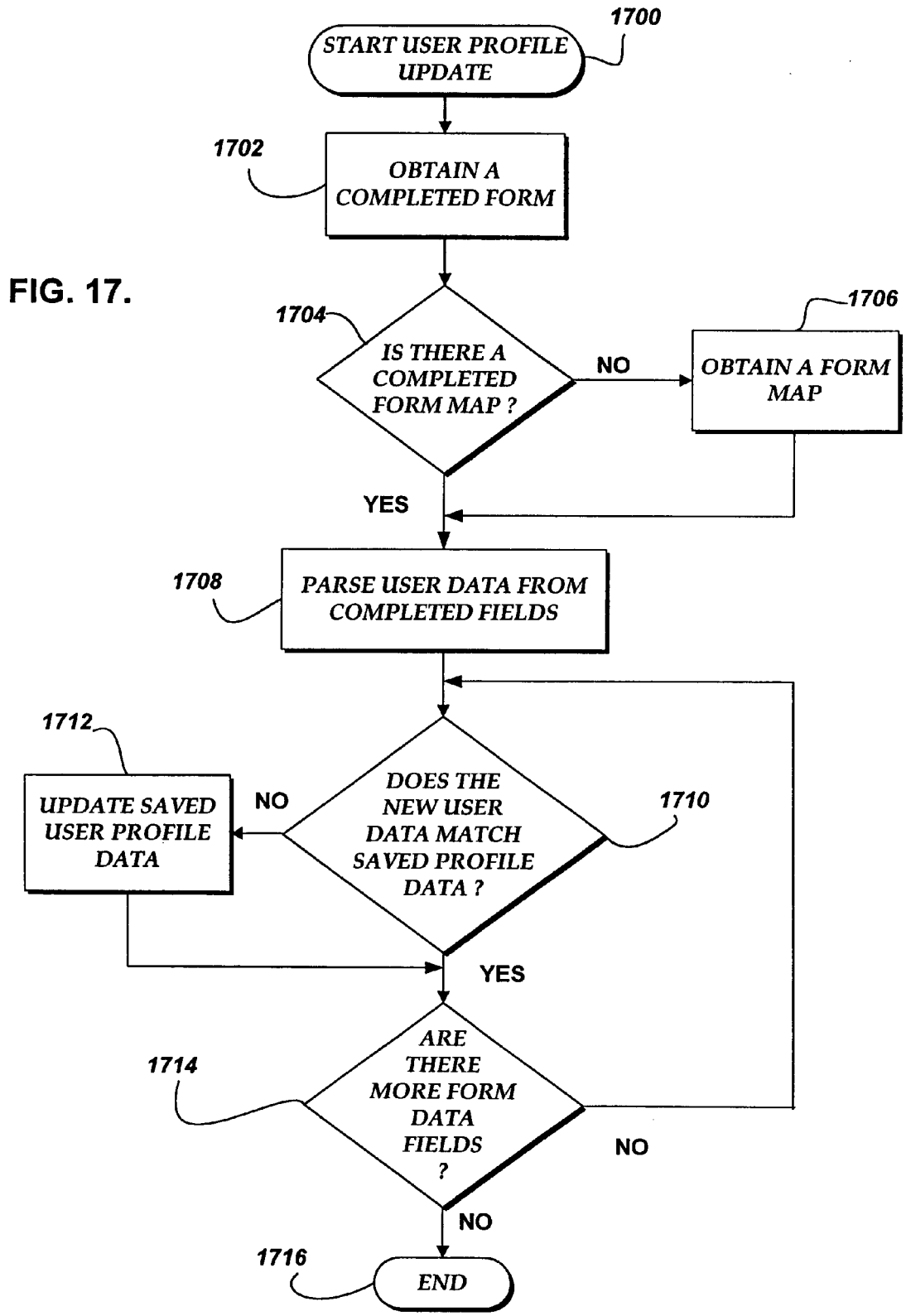
FIG. 17 is a flow diagram illustrative of the routine implemented by the fill server computer system of FIG. 5 for updating a user profile in accordance with the present invention.

FIG. 17 is a flow diagram illustrative of a sub-routine 1700 implemented by the fill bundle generator application 88 of the fill server 34 for updating a user profile in accordance with the present invention. The sub-routine 1700 begins at block 1702 with the fill bundle generator application 88 obtaining a completed electronic form at in a manner described at block 614 of FIG. 6. At block 1704, the fill bundle generator application 88 attempts to locate a complete form map from the form map database 38. If the corresponding form map does not exist, has been deleted, or is incomplete, at block 1706, the fill bundle generator application 88 generates a new form map in a manner described above. If the form map exists at block 1704 or after a form map is created at block 1706, the raw user data corresponding to an electronic form field is parsed from completed form at block 1708.

At decision block 1710, a determination is made whether the user data parsed from the completed form matches the user data stored in the user profile. If it does not match, or if the user profile does not contain data for the identified field, the user profile data is updated at block 1712. At decision block 1714, a determination is made whether there exists any additional fields on the form to be parsed and inspected. If so, the process returns to block 1710. If, however, no further fields need to be parsed and inspected, the routine is completed at block 1716. By updating the user profile as electronic forms are submitted, the fill bundle generator application 88 maintains current user data and allows the user to expand the profile by filling out more electronic forms. As would be readily understood, the updating sub-routine is independent from and not considered essential to the other aspects of the invention.

Although the present invention has been described in terms of utilizing shippable code which merges into the electronic form to be completed, it may be possible to implement some or all of the functions of the shippable code by signing the code. In the alternative embodiment, the fill bundle would be transferred to the document browser computer 30 as signed JAVA™ code segments and would interact with form application windows to complete the fields. The creation and execution of signed JAVA™ applications is known to those skilled in the art. Nevertheless, from a user perspective a fill bundle would still be selected and dragged to an electronic form to initiate the completion of one or fields. The use of signed applications would be considered to be within the scope of the present invention.

By utilizing shippable code segments which are presented to a user as a graphical/textual representation, the present invention facilities the completion of one or more fields of an electronic form. Moreover, utilizing standard WWW Web browser functionality, the present invention facilities a user's access to personal information from any number of computer systems without requiring the user to install or maintain software applications and without requiring cross-communication between computer systems.

While the preferred embodiment of the invention has been illustrated and described, it will be appreciated that various changes can be made therein without departing from the spirit and scope of the invention.

The invention claimed is:

1. A method for completing an electronic form comprising:
   creating a user profile associated with a user, wherein the user profile includes user data;
   configuring a security level to associate with the user data, wherein the security level associates a subset of the user data to a form type;
   obtaining an electronic form having a field to be completed;
   dynamically generating a form map, wherein the form map identifies an association between the user data and the field in the electronic form;
   obtaining the user profile from a fill server upon receiving a request from a client computer, wherein the fill server and the client computer are distinct devices;
   retrieving the subset of the user data from the user profile based on the form type of the electronic form;
   completing the field according to the form map with the subset of the user data;
   parsing the subset of the user data from the field to create field data;
   comparing the field data to the corresponding user data in the user profile; and,
   replacing the user data in the user profile with the field data, when the field data is different from the user data in the user profile.

2. The method as recited in claim 1, wherein the step of obtaining a user profile includes:
   transmitting a user identification and a signature of the electronic form to the fill server; and
   obtaining the user profile from the fill server, wherein the user profile corresponds to the user identification.

3. The method as recited in claim 2, wherein the user identification includes a user ID and a user password.

4. The method as recited in claim 3, wherein the electronic form signature includes a text string having a uniform resource locator of the electronic form.

5. The method as recited in claim 4, wherein the electronic form signature includes a descriptor of the one or more fields of the electronic form.

6. The method as recited in claim 5, wherein the electronic form signature includes a descriptor of form field requirements.

7. The method as recited in claim 6, wherein the user profile is represented by a graphical icon on a display screen and wherein the subset of the user data is transferred to the electronic form on manipulation of the graphical icon within the display screen.

8. The method as recited in claim 7, wherein the user profile includes shippable code embodying the subset of the user data corresponding to the fields of the electronic form, and wherein completing at least one of the fields of the electronic form includes executing the shippable code to complete at least one of the fields of the electronic form.

9. The method as recited in claim 8, wherein the step of obtaining the user profile from the fill server comprises displaying a second application indicative of the user profile containing data corresponding to the field of the electronic form according to the form map.

10. The method as recited in claim 9, wherein the step of dynamically generating the form map comprises generating a fill bundle corresponding to a merger of the subset of the user data within at least one of the user profile and the form map corresponding to a form signature, wherein the fill bundle is embodied in a graphical representation.

11. The method as recited in claim 10, further comprising obtaining the user profile corresponding to a user identification from a database having a user profile organized according to the user identification.

12. The method as recited in claim 11, further comprising when the fill server does not include the form map corresponding to a form signature, generating a new form map based upon the form signature.

13. The method as recited in claim 12, wherein the fill bundle includes shippable code containing commands for completing one or more corresponding fields of the electronic form.

14. The method as recited in claim 13, further comprising a user information server in communication with the fill server and providing the subset of the user data to the fill server.

15. The method as recited in claim 14, further comprising a form map server in communication with the fill server and providing form maps corresponding to at least one field of the electronic form, wherein a graphical representation includes a merger of the form map and the subset of the user data.

16. A machine-readable medium having stored thereon a plurality of instructions, the plurality of instructions when executed by a processor, cause the processor to perform a method comprising the steps of:

creating a user profile associated with a user, wherein the user profile includes user data;

configuring a security level to associate with the user data, wherein the security level associates a subset of the user data to a form type;

obtaining an electronic form having a field to be completed;

dynamically generating a form map, wherein the form map identifies an association between the user data and the field in the electronic form;

obtaining the user profile from a fill server upon receiving a request from a client computer, wherein the fill server and the client computer are distinct devices;

retrieving the subset of the user data based on the form type of the electronic form;

completing the field according to the form map with the subset of the user data;

parsing the subset of the user data from the field to create field data;

comparing the field data to the corresponding user data in the user profile; and, replacing the user data in the user profile with the field data, when the field data is different from the user data in the user profile.

* * * * *